(12) United States Patent
Bauerle et al.

(10) Patent No.: US 7,693,625 B2
(45) Date of Patent: Apr. 6, 2010

(54) STATE OF HEALTH MONITORING AND RESET METHODS AND SYSTEMS FOR ON-BOARD DEVICE DRIVER INTEGRATED CIRCUITS

(75) Inventors: Paul A. Bauerle, Fenton, MI (US); Dennis M. Bogden, Grand Blanc, MI (US); J. Oscar Aparicio, Jr., Milford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 629 days.

(21) Appl. No.: 11/651,424

(22) Filed: Jan. 9, 2007

(65) Prior Publication Data
US 2008/0164987 A1 Jul. 10, 2008

(51) Int. Cl.
*B60R 27/00* (2006.01)
*G06F 19/00* (2006.01)

(52) U.S. Cl. ............... 701/29; 701/31; 701/32; 340/439

(58) Field of Classification Search ............. 701/1, 701/29, 31, 30, 32; 340/439
See application file for complete search history.

(56) References Cited

U.S. PATENT DOCUMENTS

| 4,245,315 A * | 1/1981 | Barman et al. ............ 701/114 |
| 4,497,057 A * | 1/1985 | Kato et al. ............... 714/46 |
| 5,890,080 A * | 3/1999 | Coverdill et al. .......... 701/29 |
| 2003/0144778 A1 * | 7/2003 | Miyano ................... 701/29 |
| 2004/0153286 A1 * | 8/2004 | Yamada .................. 702/183 |

* cited by examiner

*Primary Examiner*—Tan Q Nguyen

(57) ABSTRACT

A control module for a vehicle is provided. The control module includes at least one device driver implemented by the control module. The at least one device driver generates a control signal to a device of the vehicle and generates a state of health signal based on an operational status of the device driver. A processor implemented by the engine control module monitors the state of health signal from the at least one device driver and generates a running reset command to the at least one device driver based on a fault status of the state of health signal.

21 Claims, 6 Drawing Sheets

STATE OF HEALTH MONITORING AND RESET METHODS AND SYSTEMS FOR ON-BOARD DEVICE DRIVER INTEGRATED CIRCUITS

FIELD

The present invention relates to on-board vehicle diagnostic systems for device driver integrated circuits.

BACKGROUND

The statements in this section merely provide background information related to the present disclosure and may not constitute prior art.

One or more control modules control various subsystems of a vehicle. A control module typically includes a primary processor that executes software or firmware programs stored in memory. A control module may include one or more device driver integrated circuits that issue control signals to one or more components of the subsystem based on signals from the primary processor.

The primary processor typically monitors system parameters (e.g. sensor values, system voltage, and response characteristics) for faults. When a system parameter is out of range or indicates a fault, the control module typically operates the subsystems in a "limp home mode." For example, vehicle operation is limited to prevent further damage to the vehicle subsystems and maintain safety of the driver. The control module makes no attempt to restore full functionality of the vehicle subsystems until a complete shutdown of the vehicle is performed and a restart occurs. In some instances, the device driver integrated circuit corresponding to the faulty parameter just needs to be reset to restore proper functionality.

SUMMARY

Accordingly, an engine control module for a vehicle is provided. The engine control module includes at least one device driver implemented by the engine control module. The at least one device driver generates a control signal to a device of the vehicle and generates a state of health signal based on an operational status of the device driver. A processor implemented by the engine control module monitors the state of health signal from the at least one device driver and generates a running reset command to the at least one device driver based on a fault status of the state of health signal.

In other features, a transmission control module for a vehicle is provided. The transmission control module includes at least one device driver implemented by the transmission control module. The at least one device driver generates a control signal to a device of the vehicle and generates a state of health signal based on an operational status of the device driver. A processor implemented by the transmission control module monitors the state of health signal from the at least one device driver and generates a running reset command to the at least one device driver based on a fault status of the state of health signal.

In still other features, a diagnostic method for a vehicle control module is provided. The diagnostic method includes: monitoring a state of health signal generated by at least one device driver of the vehicle control module; determining a faulty status of the at least one device driver based on the state of health signal; generating a running reset command to the at least one device driver based on the faulty status of the state of health signal; and maintaining operation of the vehicle control module while the device driver performs the running reset.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
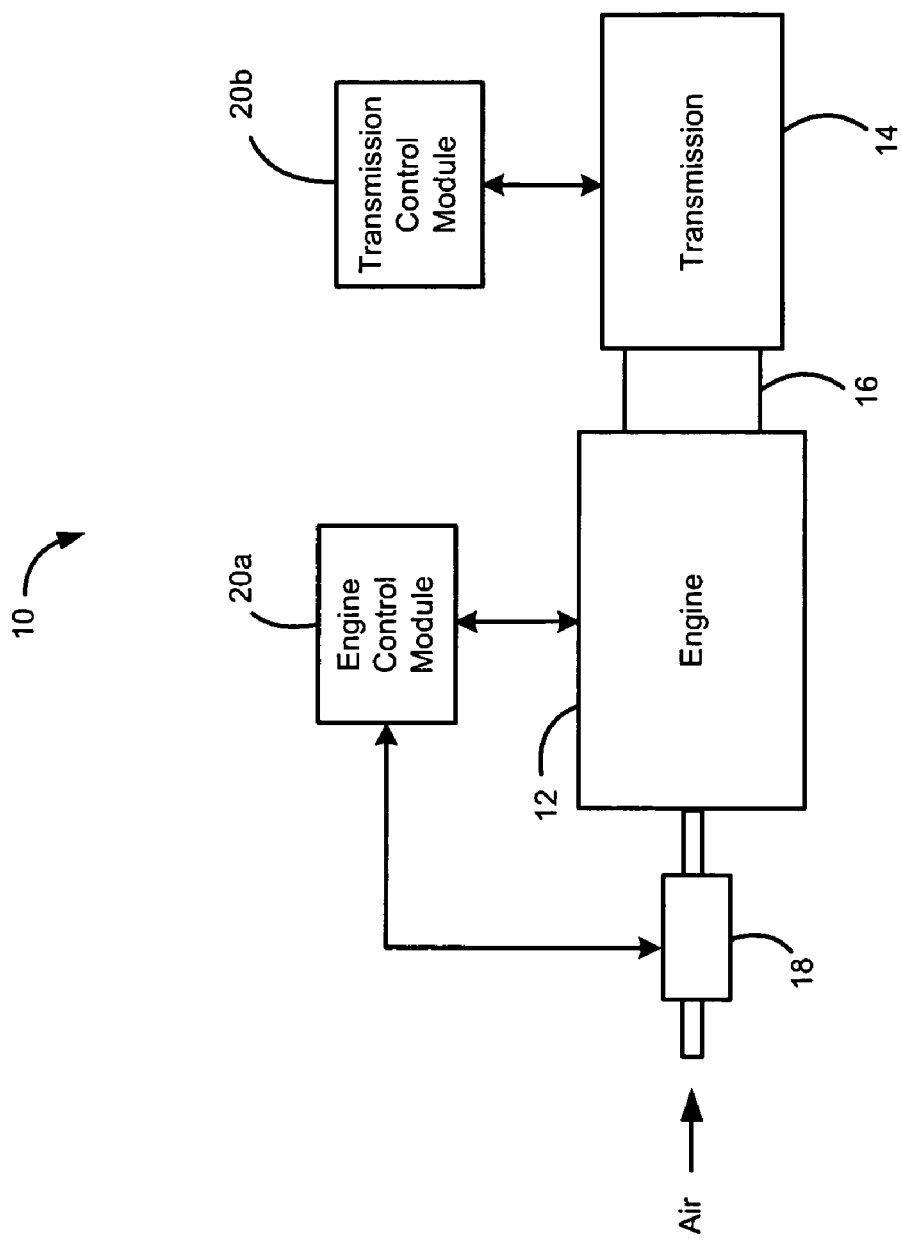
FIG. 1 is a block diagram illustrating an exemplary vehicle including a state of health monitoring and reset system according to various aspects of the present disclosure.

The following description is merely exemplary in nature and is not intended to limit the present disclosure, application, or uses. It should be understood that throughout the drawings, corresponding reference numerals indicate like or corresponding parts and features.

Referring now to FIG. 1, a non-limiting example of a vehicle 10 is shown. The vehicle 10 includes an engine 12, a transmission 14, and a torque converter 16. The engine 12 combusts an air and fuel mixture within cylinders (not shown) to produce drive torque. Air is drawn into the engine through a throttle 18. The torque converter 16 transfers and multiplies torque from the engine 12 to the transmission 14. The transmission 14 includes one or more gear sets that transfer torque to a driveline (not shown) based on a desired speed.

Figure 2:
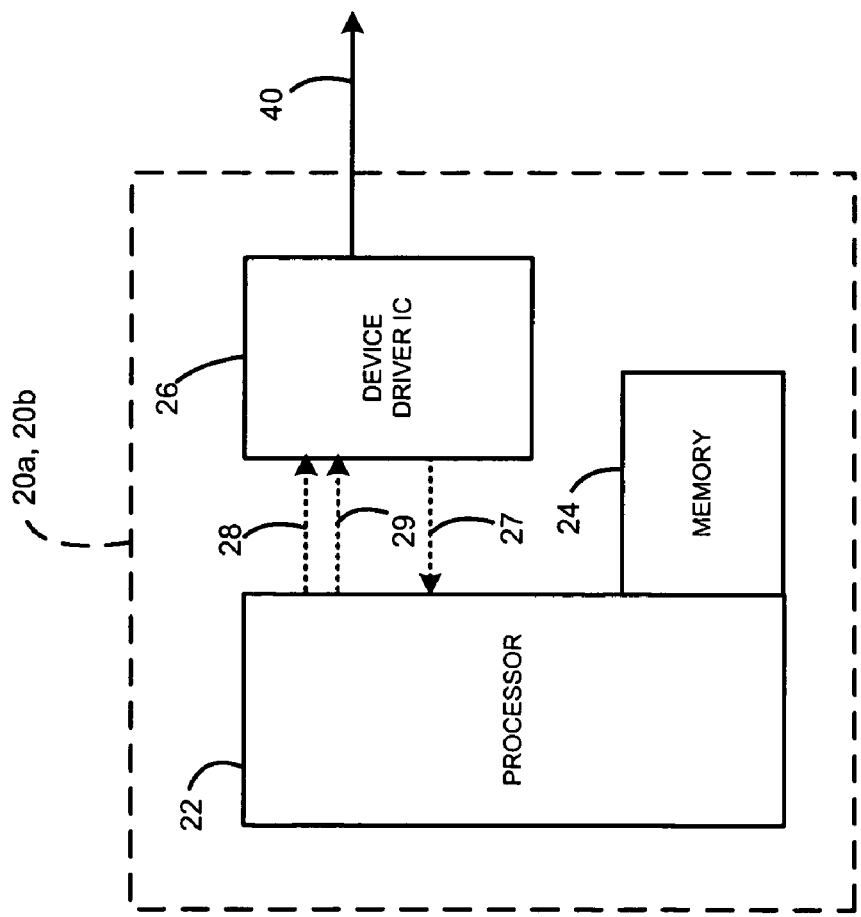
FIG. 2 is a block diagram illustrating a control module that includes a state of health monitoring and reset system according to various aspects of the present disclosure.

The exemplary vehicle 10 further includes at least one control module 20a, 20b that controls various subsystems within the vehicle 10. For example, an engine control module 20a controls the engine 12 and/or the throttle 18 and a transmission control module 20b controls the transmission 14. As shown in FIG. 2, at least one of the control modules 20a, 20b includes a main processor (shared, dedicated, or group) 22 that executes one or more software or firmware programs stored in memory 24 and one or more device driver integrated circuits 26. The one or more device driver integrated circuits 26 include logic for issuing control signals to one or more components of the subsystem. For example, in the context of the engine control module 20a, the one or more device driver integrated circuits 26 can be, but are not limited to, a throttle motor driver, a fuel injector driver, and a fuel pump driver. The processor 22 can be used to monitor a state of health (SOH) signal 27 of each of the device driver integrated circuits 26. The processor 22 generates a reset signal 28 or shutdown signal 29 to a device driver integrated circuit 26 when the state of health signal 27 for that device driver integrated circuit indicates one or more faults.

Figure 3:
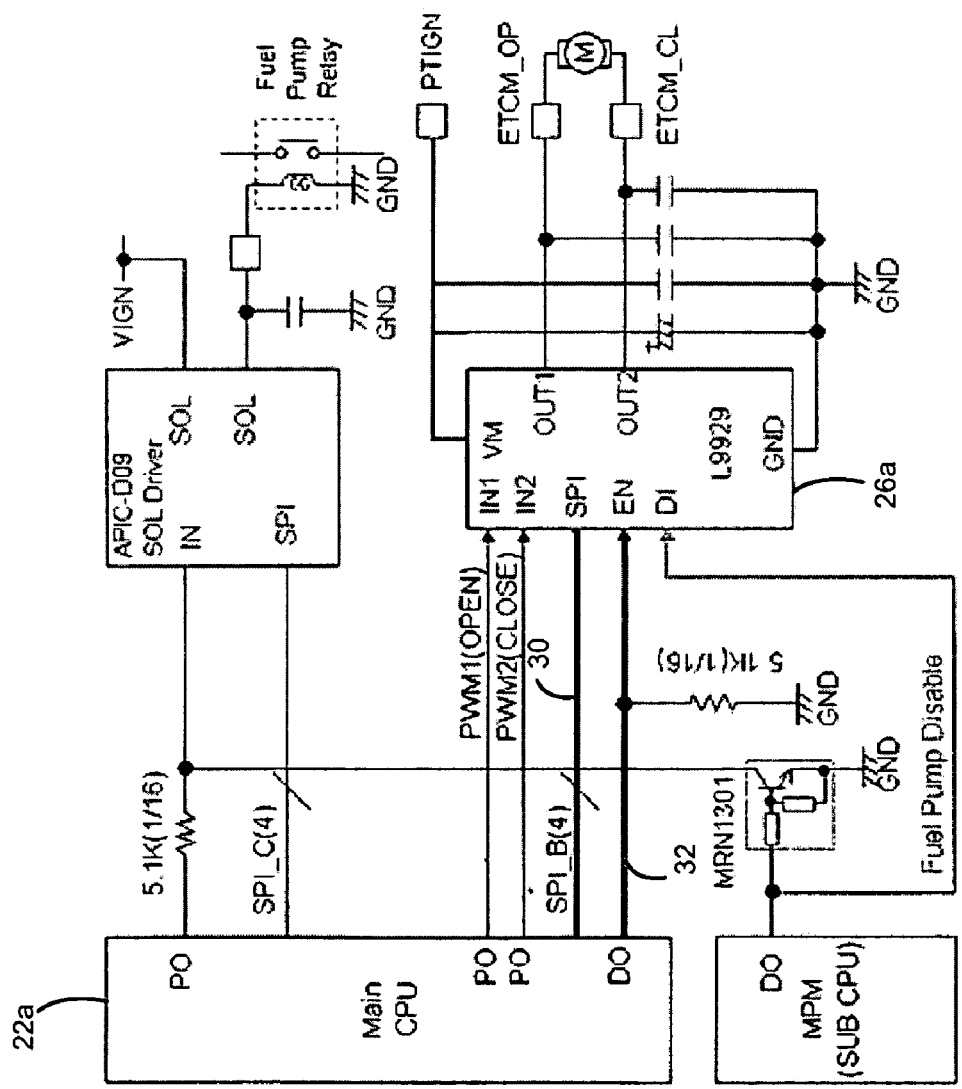
FIG. 3 is a block diagram illustrating a more detailed, exemplary control module that includes a state of health monitoring and reset system according to various aspects of the present disclosure.

A more detailed example of a state of health monitoring and reset system is shown in FIG. 3. As shown, a main processor (CPU) 22a electrically communicates with an electronic throttle control (ETC) motor driver integrated circuit 26a. The ETC motor driver integrated circuit 26a sends the SOH signal 27 (FIG. 2) via a serial data link (SPI) 30 to the CPU 22a. When the SOH signal 27 (FIG. 2) indicates the ETC motor driver integrated circuit 26a is no longer functioning properly (i.e. fault present) or no SOH signal is received, the CPU 22a resets the ETC motor driver integrated circuit 26a. The reset is performed while the CPU 22a is still powered and running. In various embodiments, as shown in FIG. 3, the CPU 22a can send the reset signal 28 (FIG. 2) to the ETC motor driver integrated circuit 26a via a separate reset line 32 or by sending a reset command over the serial data link 30. The reset line 32 electrically forces a reset while the reset command is processed by the ETC motor driver integrated circuit 26a before initiating the reset. During such time, the CPU 22a continues to run any diagnostics related to ETC to detect problems such as actuation errors.

Figure 4:
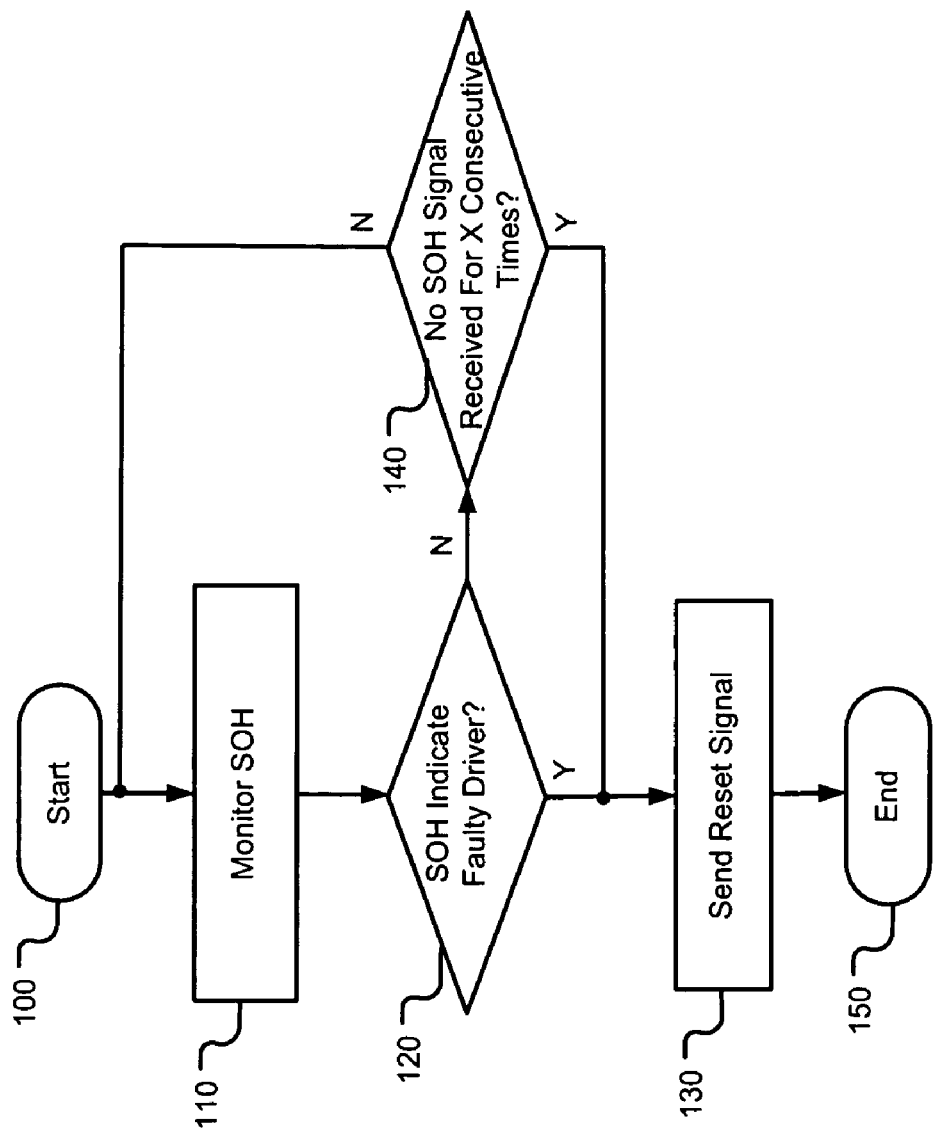
FIG. 4 is a flowchart illustrating a state of health monitoring and reset method that can be performed by a main processor of the state of health monitoring and reset system.
Figure 5:
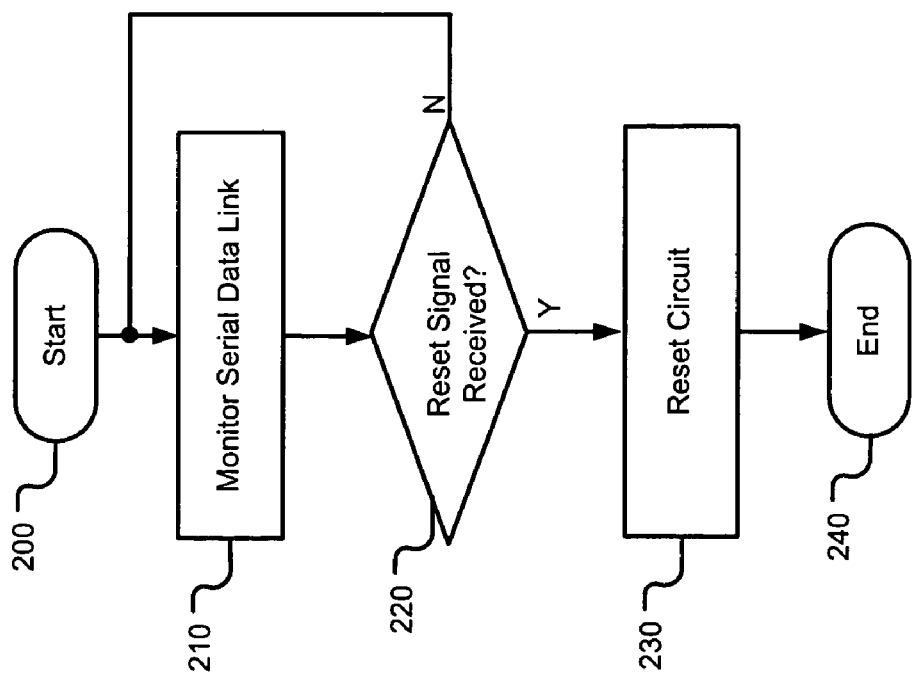
FIG. 5 is a flowchart illustrating a state of health monitoring and reset method that can be performed by a device driver integrated circuit of the state of health monitoring and reset system.
Figure 6:
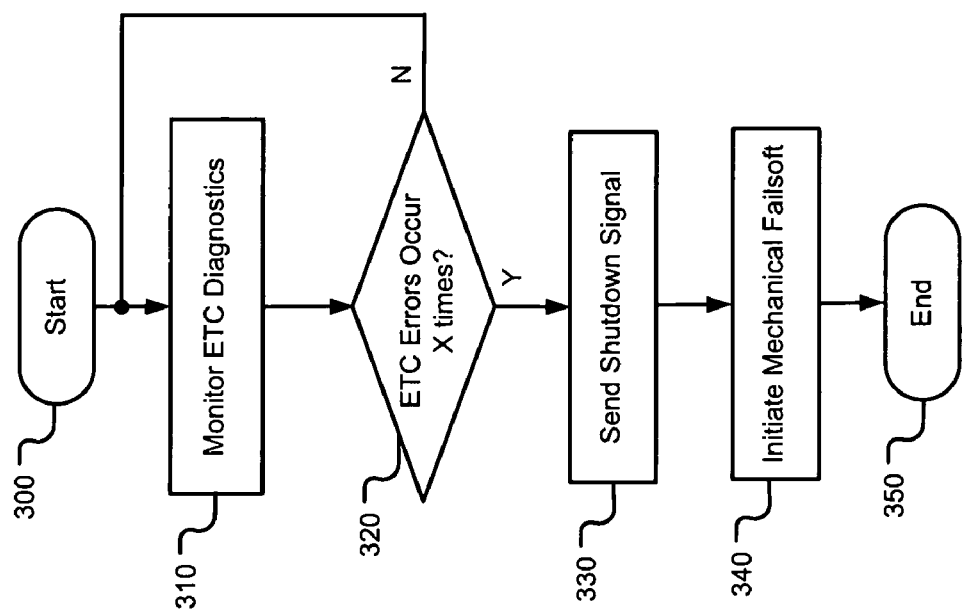
FIG. 6 is a flowchart illustrating an exemplary state of health monitoring and reset method that can be performed by the main processor when monitoring an electronic throttle control motor driver integrated circuit of the state of health monitoring and reset system.

Referring now to FIGS. 4, 5, and 6, the various flowcharts illustrate exemplary methods as performed by the state of health monitoring and reset system. The methods may be performed periodically or at scheduled events during operation of the control module 20a, 20b. As can be appreciated, the state of health monitoring and reset methods of the present disclosure are not limited to the sequential execution as shown in FIGS. 4, 5, and 6.

FIG. 4 is a flowchart illustrating an exemplary state of health monitoring and reset method that can be performed by the processor 22 of the state of health monitoring and reset system as shown in FIG. 2. The method may begin at 100. The SOH signal 27 is monitored at 110. If the SOH signal 27 indicates a faulty device driver integrated circuit 26 at 120, the reset signal 28 is sent to the device driver integrated circuit 26 at 130. Otherwise, if a SOH signal 27 has not been received for X consecutive seconds at 140, the reset signal 28 is sent over the serial data link 30 (FIG. 3) or a running reset is commanded via the reset line 32 (FIG. 3) to the device driver integrated circuit 26 at 130. Thereafter, the method may end at 150. Otherwise, if the SOH signal 27 is received and the SOH signal 27 does not indicate a faulty device driver integrated circuit 26 at 120 and 140, the processor 22 continues to monitor the SOH signal 27 at 110.

FIG. 5 is a flowchart illustrating an exemplary state of health monitoring and reset method that can be performed by the device driver integrated circuit 26 of the state of health monitoring and reset system as shown in FIG. 2. As can be appreciated, this method may be performed when the reset signal 28 is communicated over the serial data link 30 (FIG. 3). The method may begin at 200. The serial data link 30 is monitored at 210. If a reset signal 28 is received at 220, the device driver integrated circuit 26 performs a running reset at 230. Thereafter, the method may end at 240. Otherwise, if the reset signal 28 is not received at 220, the device driver integrated circuit 26 continues to monitor the serial data link 30 for a reset signal 28 at 210.

As applied to the example system shown in FIG. 3, if the ETC motor driver integrated circuit 26a was latched up, the reset signal 28 (FIG. 2) may free the latch and allow normal throttle control to resume before the CPU 22a sets a throttle actuation fault. If the actual throttle 18 was hung up on some debris thereby preventing the blade from moving, this method of resetting the ETC motor driver integrated circuit 26a would effectively cause the motor control to send a pulse width modulated signal to the throttle 18. The pulse width modulated signal would pulse between zero percent and a high number (i.e. greater than ninety percent), which may generate enough force to free the throttle 18 from the debris and prevent setting a throttle fault.

FIG. 6 is a flowchart illustrating an exemplary state of health monitoring and reset method that can be performed by the processor 22, for example, when monitoring the ETC motor driver integrated circuit 26a of FIG. 3. The method may begin at 300. One or more ETC diagnostics are monitored at 310. If one or more of the ETC diagnostics indicate that one or more ETC faults have occurred X number of times within a designated time period or Y number of consecutive times at 320, a shutdown signal 29 (FIG. 2) is sent to the ETC motor driver integrated circuit 26a at 330. Thereafter, the processor 22 allows ETC control to enter a mechanical failsoft mode at 340 and the method may end at 350. Otherwise, if the ETC diagnostics indicate that ETC faults have not occurred, the one or more ETC diagnostics are continually monitored at 310. The method allows the processor 22 to shutdown the integrated circuit without shutting down the entire control module 20a, 20b when significant faults have occurred.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. An engine control module for a vehicle, comprising:
at least one device driver implemented by the engine control module, wherein the at least one device driver generates a control signal for a throttle of an engine and generates a state of health signal based on an operational status of the throttle; and
a processor implemented by the engine control module, wherein the processor monitors the state of health signal from the at least one device driver and generates a running reset command to the at least one device driver while the engine is on based on a fault status of the state of health signal.

2. The engine control module of claim 1 further comprising a serial data link electrically disposed between the at least one device driver and the processor and wherein the state of health signal is communicated via the serial data link.

3. The engine control module of claim 2 wherein the running reset command is communicated to the at least one device driver via the serial data link.

4. The engine control module of claim 3 wherein the at least one device driver monitors the serial data link for the running reset command and when the running reset command is received, performs a running reset of the device driver without resetting the engine control module.

5. The engine control module of claim 1 further comprising a reset line electrically disposed between the at least one device driver and the processor and wherein the reset line forces a running reset of the device driver based on the running reset command.

6. The engine control module of claim 1 wherein the processor generates the running reset command when the status of the state of health signal indicates a faulty device driver.

7. The engine control module of claim 1 wherein the processor generates the running reset command when the status of the state of health signal indicates that no state of health signal is received for a predetermined time period.

8. The engine control module of claim 1 wherein the processor performs at least one diagnostic on the device driver while generating the running reset command.

9. The engine control module of claim 8 wherein the processor generates a shutdown command to the device driver when the at least one diagnostic indicates a faulty device.

10. The engine control module of claim 1 wherein the device driver is an integrated circuit.

11. A transmission control module for a vehicle, comprising:
    at least one device driver implemented by the transmission control module, wherein the at least one device driver generates a control signal for a throttle of an engine and generates a state of health signal based on an operational status of the throttle; and
    a processor implemented by the transmission control module, wherein the processor monitors the state of health signal from the at least one device driver and generates a running reset command to the at least one device driver while the engine is on based on a fault status of the state of health signal.

12. The transmission control module of claim 11 further comprising a serial data link electrically disposed between the at least one device driver and the processor and wherein the state of health signal is communicated via the serial data link.

13. The transmission control module of claim 12 wherein the running reset command is communicated to the at least one device driver via the serial data link.

14. The transmission control module of claim 13 wherein the at least one device driver monitors the serial data link for the running reset command and when the running reset command is received, performs a running reset of the device driver without resetting the transmission control module.

15. The transmission control module of claim 11 further comprising a reset line electrically disposed between the at least one device driver and the processor and wherein the reset line forces a running reset of the device driver based on the running reset command.

16. A diagnostic method for a vehicle control module, comprising:
    monitoring a state of health signal generated by at least one device driver of the vehicle control module, wherein the at least one device driver controls a throttle of an engine, and wherein the state of health signal indicates an operational status of the throttle;
    determining a faulty status of the at least one device driver based on the state of health signal;
    generating a running reset command to the at least one device driver while the engine is on based on the faulty status of the state of health signal; and
    maintaining operation of the vehicle control module while the device driver performs the running reset.

17. The method of claim 16 further comprising receiving the state of health signal via a serial data link.

18. The method of claim 17 wherein the generating comprises generating the running reset command to the at least one device driver via the serial data link.

19. The method of claim 16 further comprising initiating a running reset of the device driver via a separate reset line based on the running reset command.

20. The method of claim 16 further comprising performing at least one device diagnostic while generating the running reset command.

21. The method of claim 20 further comprising generating a shutdown command to the device driver when the at least one diagnostic indicates a faulty device.

* * * * *